United States Patent
Buckley et al.

[11] Patent Number: 6,106,121
[45] Date of Patent: *Aug. 22, 2000

[54] REAR VIEW MIRROR WITH INTEGRATED MATRIX DISPLAY

[75] Inventors: Stephen J. Buckley, Novi, Mich.; Betty L. McClanahan, Cambridge, Mass.

[73] Assignees: Chrysler Corporation, Auburn Hills, Mich.; Massachusetts Institute of Technology, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/891,164

[22] Filed: Jul. 10, 1997

[51] Int. Cl.⁷ ............................... G02B 5/08; G02B 27/14
[52] U.S. Cl. ........................ 359/839; 359/630; 349/11
[58] Field of Search ................................ 359/629, 630, 359/871, 839; 349/11, 195

[56] References Cited

U.S. PATENT DOCUMENTS

| | | | |
|---|---|---|---|
| Re. 32,576 | 1/1988 | Pastore | 359/636 |
| D. 162,098 | 2/1951 | Vacanti | D14/6 |
| 4,005,928 | 2/1977 | Kmetz et al. | 349/195 |
| 4,499,451 | 2/1985 | Suzuki et al. | 340/98 |
| 4,630,904 | 12/1986 | Pastore | 359/636 |
| 4,636,782 | 1/1987 | Nakamura et al. | 340/705 |
| 4,733,956 | 3/1988 | Erickson | 359/863 |
| 4,761,056 | 8/1988 | Evans et al. | 359/631 |
| 4,882,565 | 11/1989 | Gallmeyer | 340/461 |
| 4,978,196 | 12/1990 | Suzuki et al. | 359/630 |
| 5,037,182 | 8/1991 | Groves et al. | 359/630 |
| 5,056,890 | 10/1991 | Iino et al. | 359/630 |
| 5,303,205 | 4/1994 | Gauthier et al. | 367/108 |
| 5,416,313 | 5/1995 | Larson et al. | 250/214 AL |
| 5,566,224 | 10/1996 | ul Azam et al. | 379/58 |
| 5,570,944 | 11/1996 | Seder et al. | 353/98 |
| 5,587,699 | 12/1996 | Faloon et al. | 340/475 |
| 5,631,638 | 5/1997 | Kaspar et al. | 340/902 |
| 5,680,185 | 10/1997 | Kobayashi et al. | 349/88 |

OTHER PUBLICATIONS

SAE Technical Paper No. 96C011 entitled A Comparison of Two Product Development Approaches: Seamless Electro–Mechanical Design and Mneumonic Design with Representative Products (Mirror/Display and REarward Display Accessible by Rearview Mirror) authored by Betty Lou McClanahan, Stephen J. Buckley, Brad Geilfuss and Pushpinder Singh, Feb. 1997.

*Primary Examiner*—Cassandra Spyrou
*Assistant Examiner*—Mark A. Robinson
*Attorney, Agent, or Firm*—Jennifer M. Stec

[57] ABSTRACT

A rear view mirror includes a transparent front glass that covers a matrix display, for example an LCD display. The matrix display is translucent when activated and transparent when inactive, and behind the matrix display is a mirror-backed rear glass. Thus, light can pass through the matrix display and reflect back off the mirror-backed rear glass. Consequently, the rear view mirror can assume its conventional function of presenting images of objects that are behind the vehicle, while the pixels of the matrix display can be activated to superimpose alpha-numeric characters on the images. The characters can represent vehicle speed, time, radio station data, or other vehicle control data.

2 Claims, 2 Drawing Sheets

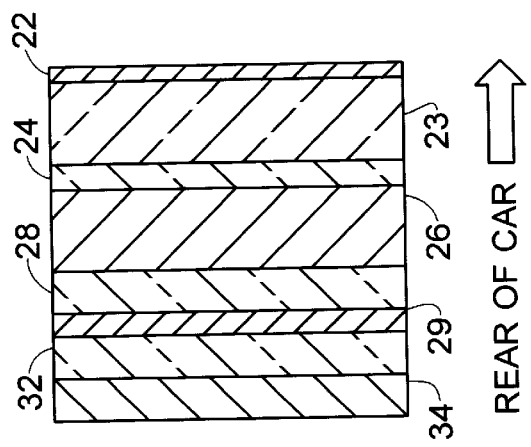
FIG. - 3
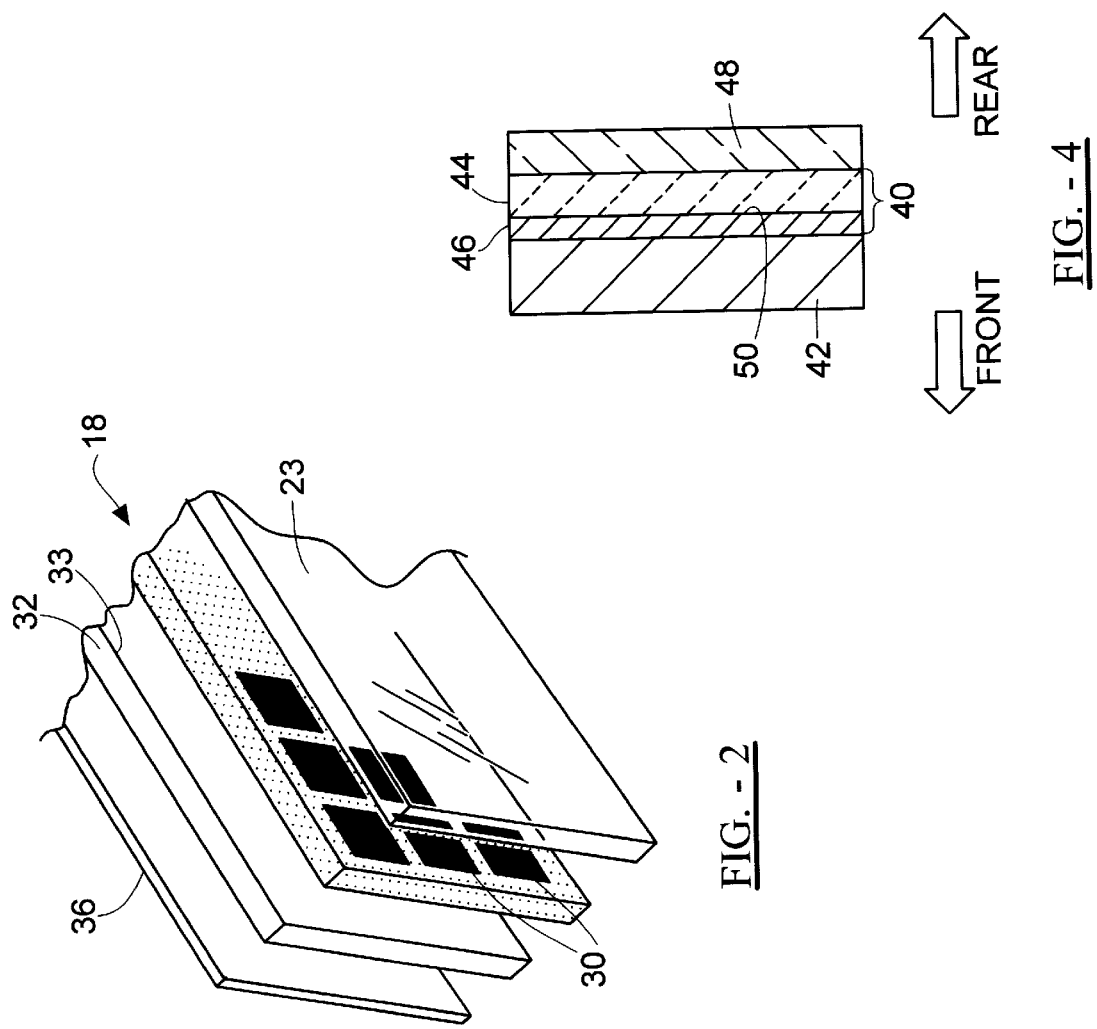
FIG. - 4
FIG. - 2

REAR VIEW MIRROR WITH INTEGRATED MATRIX DISPLAY

FIELD OF INVENTION

The present invention relates generally to vehicles, and more particularly to rear view mirrors in vehicles.

BACKGROUND OF THE INVENTION

Rear view mirrors, both center-mounted inside a vehicle passenger compartment and side-mounted outside the passenger compartment, are used to enable a driver of the vehicle to observe objects that are behind the vehicle, while the driver's gaze remains directed generally forward. Such mirrors are ubiquitous means for providing data—actual visual images of objects that are behind the vehicles—to drivers.

In addition, a significant amount of data is presented to a driver of a vehicle in analog form, e.g., by gages, and in digital form. Digital data can be presented by means of speedometer read-outs, radio read-outs, temperature read-outs, and so on.

As recognized by the present invention, it can be advantageous to combine data sources not only to realize manufacturing cost savings, but also to promote safety and data presentation effectiveness. More specifically, in the rear view mirror context, the present invention recognizes that most drivers readily accept and use mirrors to know what objects are behind their vehicles and thereby improve driving safety, and the present invention further recognizes that the use of mirrors can be promoted even further by presenting additional data on the mirrors to stimulate relatively more frequent use of the mirrors. Moreover, by presenting data on a mirror that otherwise would be presented elsewhere in the vehicle at a perhaps less convenient location, the effectiveness of the presentation of the data is improved. In other words, the present invention recognizes that it is possible that data presented on a mirror is more accessible than data presented in other vehicle locations that would not otherwise attract the driver's attention as much as does a rear view mirror.

As still further recognized herein, however, it is desirable that the data essentially be superimposed on the reflective surface of the mirror, instead of requiring that a portion of the reflective surface be blocked by the data presentation. This is to enhance the cooperation between the two displays (i.e., an alpha-numeric digital display and the image display of the reflective surface) and to avoid relinquishing areas of the reflective surface and, thus, avoid reducing the field of view that a conventional mirror could otherwise provide.

Accordingly, it is an object of the present invention to provide a rear view system which presents to a driver an image of the area behind a vehicle. Another object of the present invention is to provide a rear view system which presents alpha-numeric data superimposed on a mirrored surface, with the data representing a vehicle variable such as time, speed, temperature, etc. Still another object of the present invention is to provide a rear view system which presents alpha-numeric data on a mirrored surface that is incorporated into the mirror. Yet another object of the present invention is to provide a rear view system that is easy to use and cost-effective to manufacture.

SUMMARY OF THE INVENTION

A rear view mirror for a vehicle that defines a front and a rear includes a reflective surface and a display rearward or frontward of the reflective surface and juxtaposed therewith. With this combination of structure, light can propagate from rear to front through the display plane, be reflected by the reflective surface, and propagate back through the display from front to rear, and thus be viewed by a driver of the vehicle.

As intended by the present invention, the display selectively presents a display image on the mirror, such that the display image is superimposed on the reflective surface. In one preferred embodiment, the display image includes at least one alpha numeric character. Per present principles, the matrix display is a display selected from the group of matrix displays consisting of: active liquid crystal displays (LCD), passive liquid crystal displays, electroluminescent displays, vacuum florescent displays, and light emitting diode displays. In any event, the matrix display advantageously defines pixels having an off state, in which the pixels are deenergized and transparent, and an on state, wherein at least some of the pixels are energized and the pixels are translucent or emit light.

When the matrix display is an LCD, the mirror further includes a first transparent layer juxtaposed with the matrix display rearward of the matrix display. Also, a second transparent layer is juxtaposed with the matrix display in front of the matrix display, and the second layer holds the reflective layer. On the other hand, when the matrix display is an electroluminescent display, the reflective surface is established by an aluminum back layer of the display.

In another aspect of the present invention, a method is disclosed for presenting data in a vehicle. The method includes providing a reflective mirror, and orienting the mirror such that images of objects behind the vehicle appear in the mirror. Further, the method includes providing a matrix display in the mirror. As described in detail below, the display is selectively energized to selectively superimpose pixel mapped data on the images.

In still another aspect, a vehicle includes a rear view mirror and a matrix display juxtaposed on the rear view mirror to superimpose alpha-numeric characters on images in the mirror.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is an exploded perspective detail view of the mirror as indicated at the curve 2—2 in FIG. 1, with portions broken away and with the polarizing layers, TFT grid, and liquid cell layer of the matrix display shown integrated with other components for simplicity;

FIG. 3 is a cross-sectional view as seen along the line 3—3 in FIG. 1; and

FIG. 4 is a cross-sectional view of an alternate embodiment, showing an electroluminescent matrix display in which the aluminum backplane of the display establishes the reflective surface, as would be seen along the line 3—3 in FIG. 1.

DETAILED DESCRIPTION OF THE PREFERRED EMBODIMENT

Figure 1:
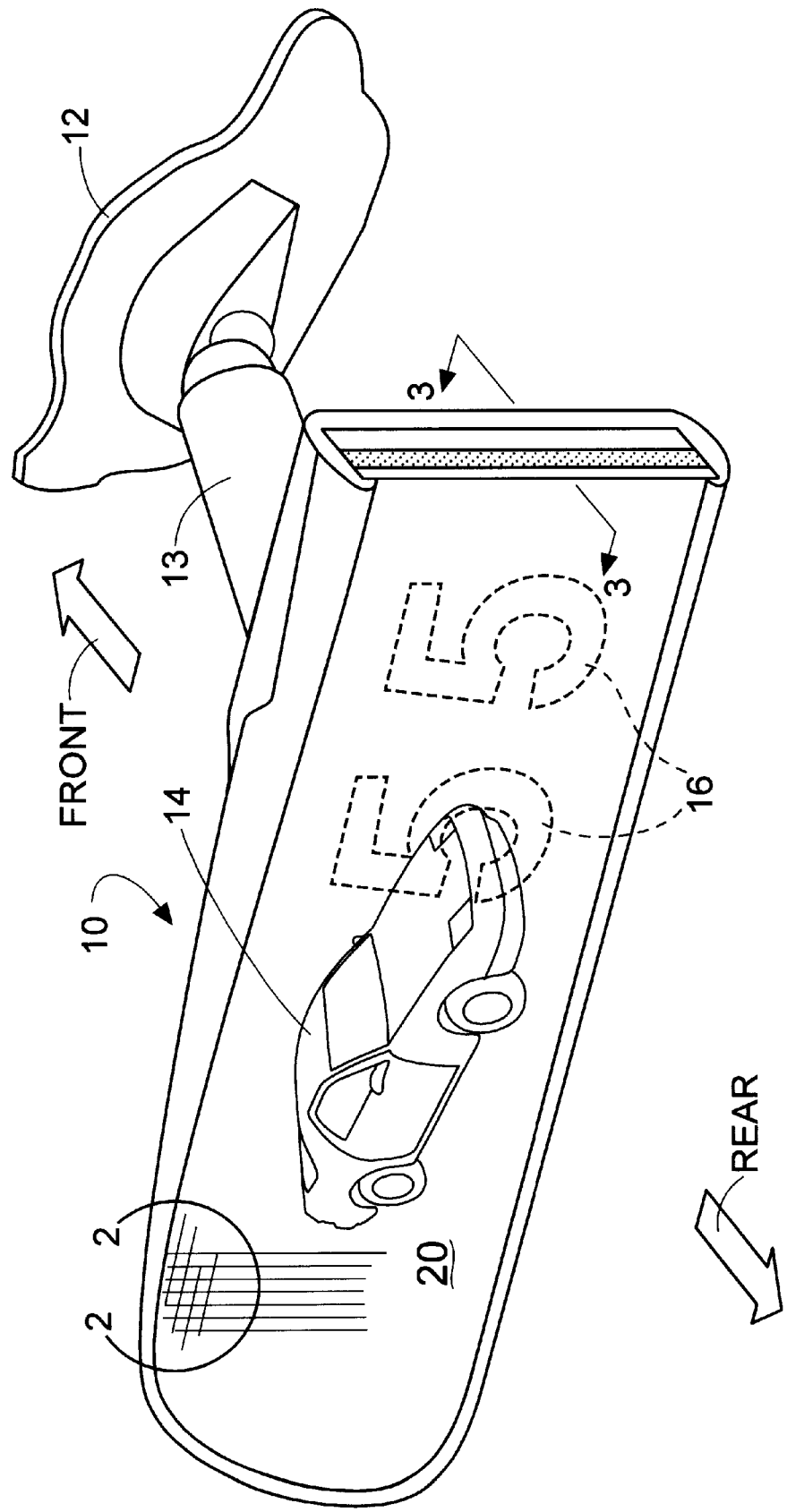
FIG. 1 is a perspective view of the rear view mirror of the present invention, with portions of the vehicle in which the mirror is mounted broken away, showing in phantom an alpha numeric presentation to indicate that the presentation is superimposed on the image of an object in the mirror.

Referring initially to FIG. 1, a rear view mirror is shown, generally designated 10, that is mounted in a vehicle 12 by means of a rigid pivotable mirror mount 13. While the rear view mirror 10 shown in FIG. 1 is a center-mounted interior mirror, it is to be understood that the principles of the present invention apply to side-mounted exterior mirrors and visor-mounted vanity mirrors on the vehicle 12 as well.

As shown, the mirror 10 presents an image 14 of an object that is behind the vehicle 12. In other words, light can propagate from an object that is rearward of the vehicle 12 to establish a reflected beam after being reflected by the mirror 10, and the reflected beam establishes an image 14 of the object. As used herein, terms of relative position are referenced to the vehicle 12; thus, the vehicle 12 defines a front denoted by "FRONT" arrows in the Figures and a rear denoted by "REAR" arrows in the Figures.

Additionally, as more fully disclosed below the mirror 10 includes a display, preferably a matrix display. In accordance with the present invention, the matrix display selectively presents a display image, such as icons, ISO symbols, dot composed graphics, or alpha-numeric characters 16, that is superimposed on the image 14 of the object as shown. The alpha-numeric characters can represent any appropriate vehicle data, e.g., vehicle speed, time of day, vehicle fuel status, radio station frequency, temperature, trip data, traffic status, E-mail, and so on. Alternatively, the matrix display can present images of objects, in addition to or in lieu of the alpha-numeric characters 16. In any case, when the pixels of the matrix display are deenergized, the pixels of the matrix display are transparent. In contrast, when the matrix display is energized to present a display image, the pixels are translucent but not opaque, as indicated by the phantom lines in FIG. 1.

FIGS. 2 and 3 show details of one preferred embodiment of the present mirror 10. A matrix display, generally designated 18, is disposed in front of a first transparent glass or plastic layer 20. It will be readily understood in reference to the Figures that the first layer 20 faces the driver of the vehicle 12, and thus is rearward, relative to the vehicle 12, of the matrix display 18 when the mirror 10 is mounted on the vehicle 12 as a rear view mirror.

As envisioned by the present invention, the matrix display 18 is a display selected from the group of matrix displays consisting of: active liquid crystal displays (LCD), passive liquid crystal displays, electroluminescent displays, vacuum florescent displays, and light emitting diode displays. In the embodiment shown in FIGS. 2 and 3, the matrix display 18 is an active LCD.

Accordingly, the matrix display 18 includes, in sequence from the rear of the vehicle to the front, a front polarizing layer 22, a glass layer 23, a liquid cell layer 24 flushly positioned against the glass layer 23, a thin film transistor (TFT) grid 26 flushly positioned against the liquid cell layer 24, and an intermediate glass layer 28 flushly positioned against the TFT grid 26. Moreover, a rear polarizing layer 29 is flushly positioned against the intermediate glass layer 28.

In accordance with active LCD principles, the TFT grid 26 and liquid cell layer 24 establish pixels 30 (shown schematically in FIG. 2) of the matrix display 18. Preferably, the matrix display 18 contains about seventy (70) pixels per linear inch of the display 18. Moreover, to render the pixels 30 translucent when energized, the polarizing layers 22, 29 are inefficient polarizers, i.e., the polarizing layers 22, 29 are "lossy". In other words, the efficiency of the polarizing layers 22, 29 is established to be sufficiently "lossy" to render the pixels 30 translucent when energized, and transparent when deenergized.

In front of the matrix display 18, as shown in FIGS. 2 and 3, is a reflective layer 32 that establishes a rearwardly-oriented reflective surface 33. Appropriate matrix display driver electronics 34 are electrically connected to the TFT grid 26 to selectively energize the matrix display 18 in accordance with well-known principles.

As can be readily appreciated from the Figures, the matrix display 18 and reflective layer 32 are co-extensive with each other. In other words, both the matrix display 18 and reflective layer 32 span substantially the entire mirror 10.

With this combination of structure, light from an object behind the vehicle 12 can propagate from rear to front through the matrix display 18, be reflected by the reflective surface 33, and propagate back through the matrix display 18 from front to rear, to be viewed by the driver of the vehicle 12 as the object image 14 (FIG. 1). Simultaneously, the matrix display can be selectively energized to superimpose the characters 16 (FIG. 1) on the object image 14 as shown.

FIG. 4 shows an alternate embodiment in which an electroluminescent matrix display 40 with driver electronics 42 includes an electroluminescent layer 44 sandwiched between an aluminum backplane 46 and a rear glass or plastic layer 48 that covers the matrix display 40. In the embodiment shown in FIG. 4, the rear surface 50 of the aluminum backplane 46 establishes the reflective layer of the present invention. In other embodiments of electroluminescent displays, the layer 48 is a semi-transparent top electrode layer, and as such can establish the reflective layer, with light from the electroluminescent layer 44 propagating through the layer 48.

While the particular REAR VIEW MIRROR WITH INTEGRATED MATRIX DISPLAY as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A rear view mirror for a vehicle, comprising:
    a liquid crystal display selectively presenting a display image on a reflective layer, such that the display image is superimposed on the reflective surface and includes at least one alpha numeric character, the liquid crystal display includes pixels and defines an off state, in which the pixels are deenergized and transparent, the liquid crystal display also defining an on state, wherein at least some of the pixels are energized and the energized pixels are translucent;
    a first transparent layer juxtaposed with the liquid crystal display rearward of the liquid crystal display;
    a first inefficient polarizing layer juxtaposed with the first transparent layer rearward of the first transparent layer;
    a second transparent layer juxtaposed with the liquid crystal display frontward of the liquid crystal display, the second layer holding the reflective layer; and
    a second inefficient polarizing layer located between the second transparent layer and the liquid crystal display, the second inefficient polarizing layer rendering the altered light translucent.

2. A method for presenting data in a vehicle, comprising the steps of:
    providing a reflective mirror;
    orienting the mirror such that images of objects behind the vehicle appear in the mirror;

providing a display in the mirror such that the display is co-extensive with the mirror, the display having a liquid crystal display selectively presenting a display image on a mirror, the display having a first inefficient polarizing layer rearward of the liquid crystal display, and the display having a second inefficient polarizing layer located frontward of the liquid crystal display, the second inefficient polarizing layer rendering light translucent; and selectively energizing the liquid crystal display to selectively superimpose alpha-numeric data on the images.

* * * * *